(12) United States Patent
Vasapollo

(10) Patent No.: US 10,071,821 B2
(45) Date of Patent: Sep. 11, 2018

(54) UNDERGROUND HANGAR FOR HELICOPTERS

(71) Applicant: Raffaella Vasapollo, Arezzo (IT)

(72) Inventor: Raffaella Vasapollo, Arezzo (IT)

( * ) Notice: Subject to any disclaimer, the term of this patent is extended or adjusted under 35 U.S.C. 154(b) by 274 days.

(21) Appl. No.: 14/782,320

(22) PCT Filed: Apr. 16, 2014

(86) PCT No.: PCT/IB2014/060754
§ 371 (c)(1),
(2) Date: Oct. 3, 2015

(87) PCT Pub. No.: WO2014/170834
PCT Pub. Date: Oct. 23, 2014

(65) Prior Publication Data
US 2016/0039537 A1 Feb. 11, 2016

(30) Foreign Application Priority Data
Apr. 18, 2013 (IT) .............................. AR2013A0018

(51) Int. Cl.
*B64F 1/22* (2006.01)
*E04H 6/44* (2006.01)

(52) U.S. Cl.
CPC ............... *B64F 1/222* (2013.01); *E04H 6/44* (2013.01)

(58) Field of Classification Search
CPC ... E01F 3/00; E04H 6/44; B64F 1/222; B63G 11/00
USPC ......................................................... 414/249
See application file for complete search history.

(56) References Cited

U.S. PATENT DOCUMENTS

| 2,655,223 | A | * | 10/1953 | Villars | B66F 7/025 187/214 |
| 3,858,371 | A | * | 1/1975 | Averill | E04H 6/44 244/114 R |
| 4,015,824 | A | * | 4/1977 | Profet | B66F 3/18 254/103 |
| 4,416,578 | A | * | 11/1983 | Behncke | E04H 6/06 414/249 |

(Continued)

FOREIGN PATENT DOCUMENTS

| DE | 3313637 | 10/1984 |
| EP | 2163505 | 3/2010 |
| FR | 2602814 | 2/1988 |

OTHER PUBLICATIONS

English Abstract of DE 3313637.
English Abstract of FR 2602814.
English Abstract of EP 2163505.

*Primary Examiner* — Kaitlin S Joerger
(74) *Attorney, Agent, or Firm* — Preston Smirman; Smirman IP Law, PLLC

(57) ABSTRACT

An underground hangar for storing helicopters includes an underground room (1), made by a structure of reinforced concrete (2) inside which a plurality of columns (11) are situated near the walls and anchored to the floor of reinforced concrete. The columns (11) support a platform (10) which moves between the ground level and the underground level. The helicopter can land on the platform (10) and be automatically brought to the underground level, after which the underground room is automatically closed by the doors (8) and the pilot can go out through an adjacent underground room (1a) provided with its access trap door (4).

17 Claims, 9 Drawing Sheets

(56) References Cited

U.S. PATENT DOCUMENTS

| | | | | |
|---|---|---|---|---|
| 4,594,044 | A * | 6/1986 | Soot | E04H 6/282 414/263 |
| 4,665,857 | A * | 5/1987 | Akerman | B63B 35/50 114/261 |
| 4,889,202 | A * | 12/1989 | Bron | G01G 21/23 177/134 |
| 5,036,951 | A * | 8/1991 | Frangos | B66F 7/025 187/205 |
| 5,915,907 | A * | 6/1999 | Yatou | E04H 6/287 104/44 |
| 7,465,141 | B1 * | 12/2008 | Fournier | E04H 6/28 414/234 |
| 7,771,155 | B2 * | 8/2010 | Thiel | B25H 1/0014 187/214 |
| 8,292,031 | B2 * | 10/2012 | Penn | B66B 11/06 182/141 |
| 8,662,000 | B2 * | 3/2014 | Vandenworm | B63B 1/041 114/263 |
| 2011/0251935 | A1 * | 10/2011 | German | B60S 5/06 705/30 |
| 2016/0039537 | A1 * | 2/2016 | Vasapollo | E04H 6/44 244/114 R |

* cited by examiner

UNDERGROUND HANGAR FOR HELICOPTERS

CROSS-REFERENCE TO RELATED APPLICATION

The instant application is a national phase of PCT International Patent Application No. PCT/IB2014/060754 filed Apr. 16, 2014 and claims priority to Italian Patent Application No. AR2013A000018 filed Apr. 18, 2013, the entire specifications of both of which are expressly incorporated herein by reference.

DESCRIPTION

Technical Field

The present invention relates to an underground hangar for storing helicopters.

Background Art

Storing of helicopters conventionally requires a special outer hangar constructed near the landing area, which occupies space and alters the landscape.

After landing, the helicopter must be transported into the hangar and consequently, the operator must have a tractor or another means aimed at transporting helicopters. So the operator can tow the helicopter into the hangar, with a chain or rope, if it has tired wheels.

It Becomes more complicated if the helicopter is equipped with landing skids or even floats, as it happens in most cases. In this case, it is necessary to provide a tired landing gear, of suitable capacity, on which the helicopter lands so as to be transported into the hangar by suitable means. Ultimately, the aircraft owner must have one or two additional machines, aimed only at storing, and enough space for the landing and building construction areas, as well as the necessary construction permissions, which in some cases are very difficult to obtain due to the planning restrictions.

It is known that ships can be provided with below deck hangars, as it is described, for example, in DE 33 13 637 A1. This document teaches a landing platform which can be lifted and lowered vertically from the deck level to below deck level and vice versa, and when the platform is on the below deck level, a watertight door closes the upper opening. The platform is brought down to the below deck space along four columns provided with a rack and motor system having pinions which engage with the racks, in order to lift and lower the platform. However, the solution described in DE 33 13 637 A1 features some limits related to a safe handling of the structure, its operation noisiness and stability. Moreover, although the above mentioned solution is quite common and desired on ships, the document only slightly suggests the possibility to use similar solutions in land installations, whose structural problems to resolve are very different.

Technical Problem

The main object of the present invention is to allow to store helicopters in safety conditions, in an underground hangar, by making them land on an access platform which allows the hangar to enter directly, without the need to use other transportation or handling means.

Another object of the present invention is to propose an underground hangar for storing helicopters provided with a movable platform, which moves in a particularly silent and reliable way.

Another object of the present invention is to propose an underground hangar for storing helicopters, having a stable and safe structure.

Technical Solution

The above mentioned and other objects have been obtained by an underground hangar for storing helicopters, which comprises:
- an underground room made of reinforced concrete provided with at least four columns connected to a floor of said underground room, with each column being provided with a rack,
- a lifting helicopter carrying platform provided with at least four tubular guiding supports, each aimed at interfacing with one of said columns so as to be guided, by means of relative guiding elements, to slide vertically therealong,
- an electro-mechanical driving system comprising an electronic control unit and a plurality of gear motors, said gear motors being provided at the outlet with at least one toothed pinion, which is mounted so as to engage with said rack.

With a hangar as the one outlined above, a helicopter can land on a platform situated at the ground level, after which the platform can be lowered so as to leave the helicopter parked in the underground room below the ground level. The above outlined underground hangar has a particularly reliable, stable and safe platform handling system.

BRIEF DESCRIPTION OF DRAWINGS

These and other advantages related to the device of the invention as well as its further characteristics will thus become easier by means of the illustration of the preferred, not limiting embodiments, as described later with the help of the enclosed drawings, in which.

MODE FOR INVENTION

Figure 1:
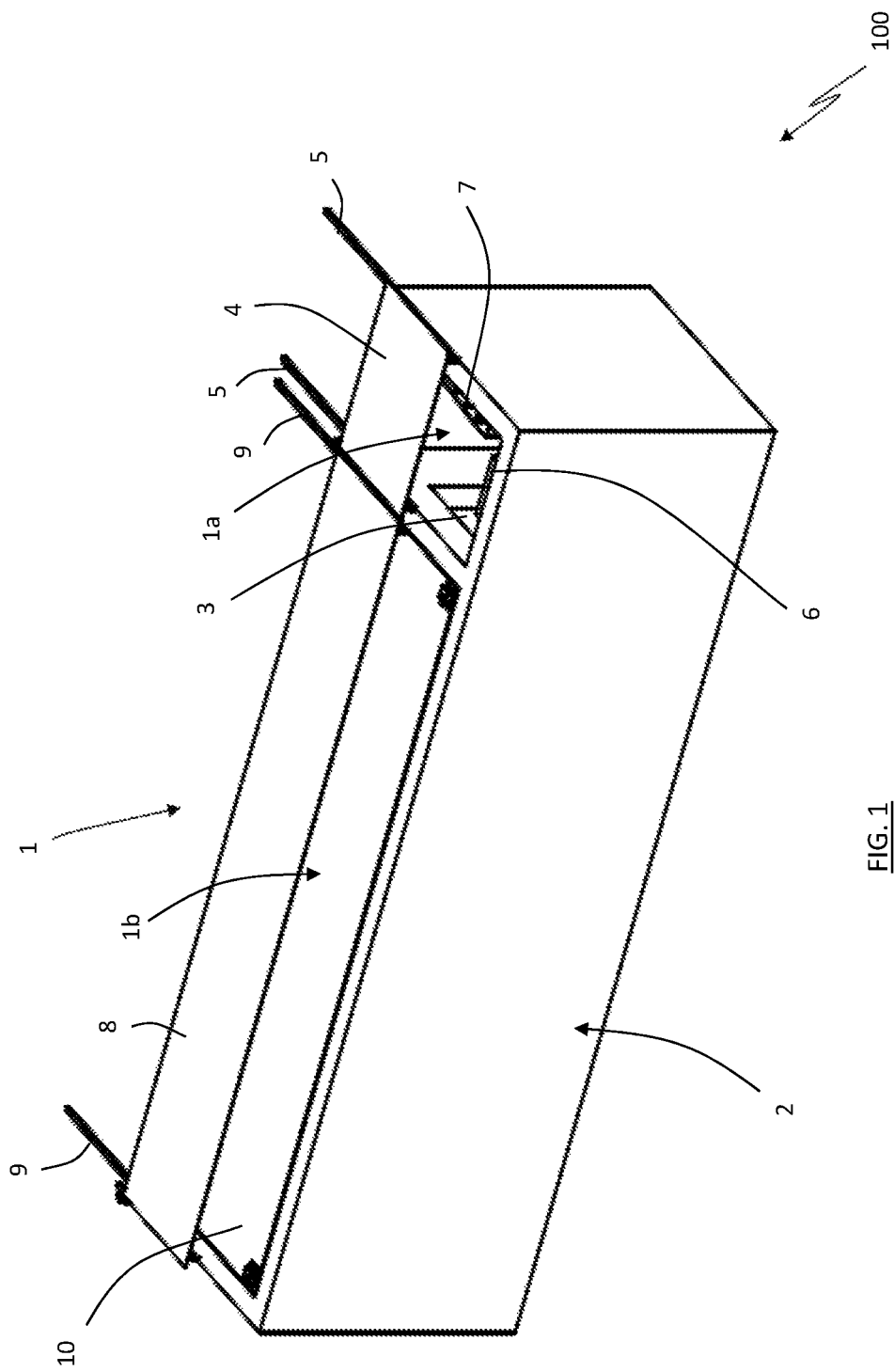
FIG. 1 is a schematic perspective view of an underground hangar according to a first embodiment of the invention.
Figure 2:
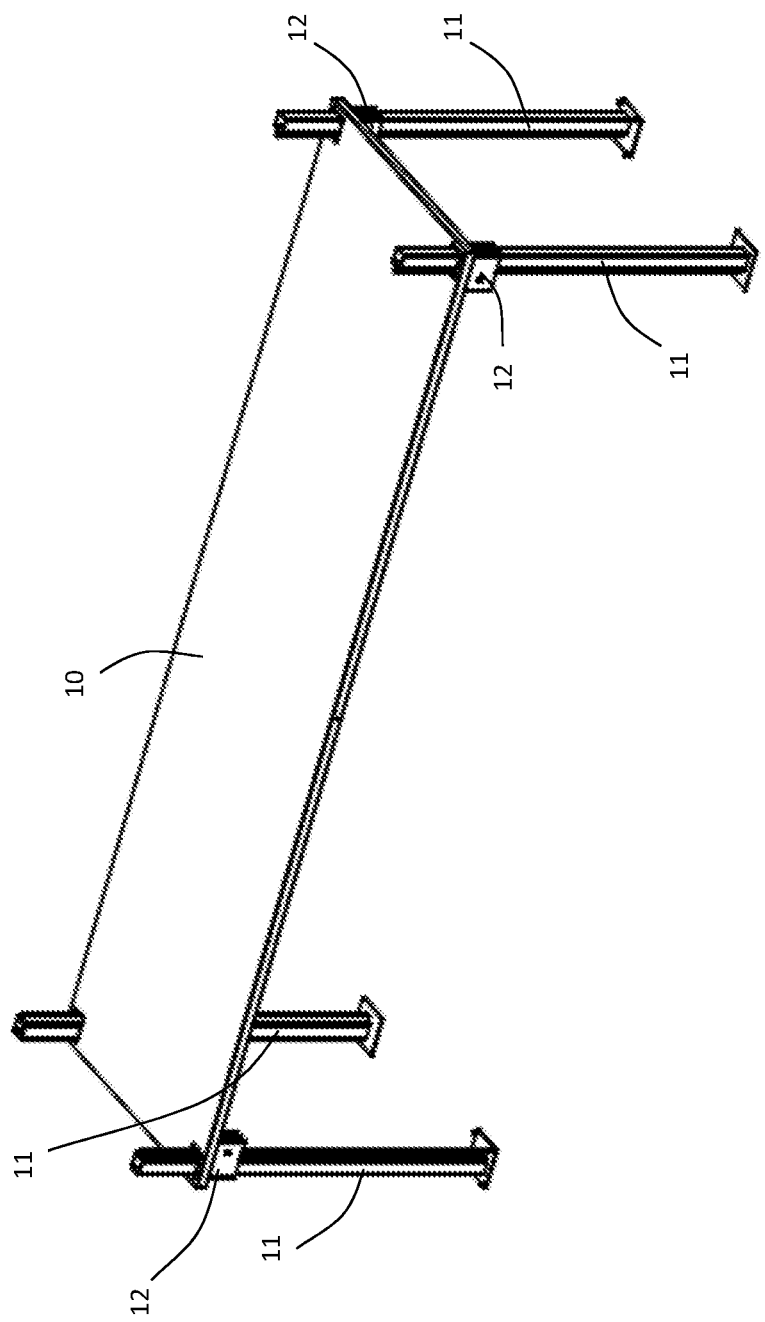
FIG. 2 is a schematic perspective view of a platform and the respective support columns of the hangar of FIG. 1.
Figure 3:
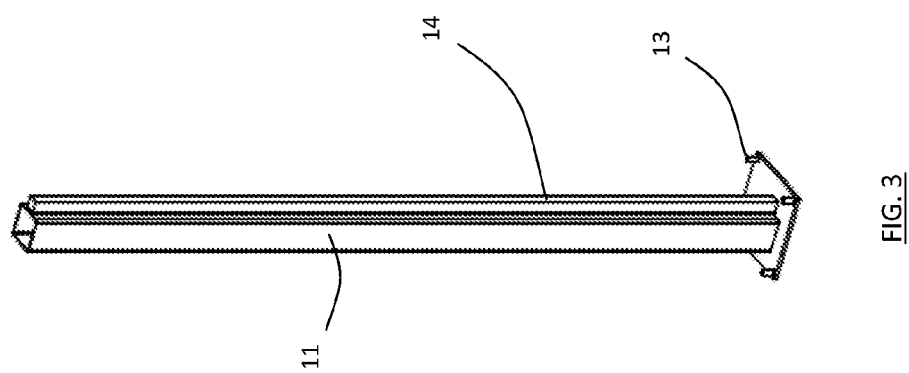
FIG. 3 is a schematic perspective view of a support column of the hangar of FIG. 1.
Figure 4:
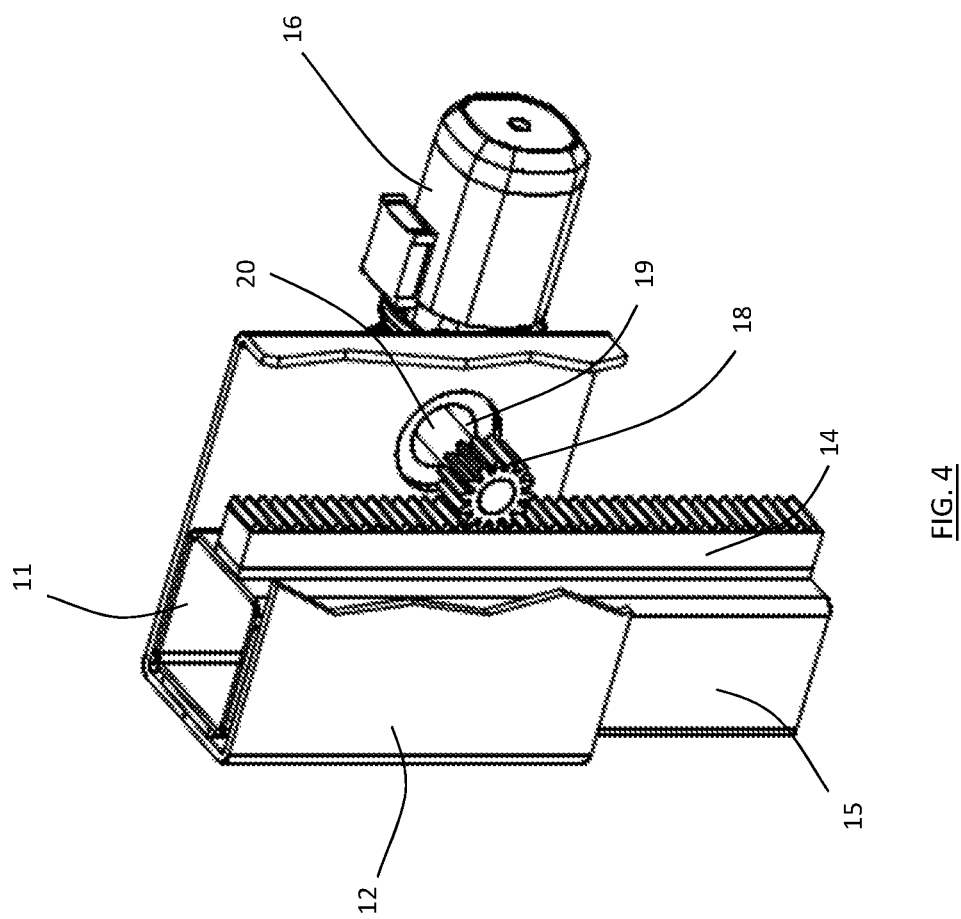
FIG. 4 is a perspective, partially cutaway view, of a support column with associated therewith a tubular guiding support and a gear motor of the underground hangar of FIG. 1.

With reference to FIGS. 1 to 4, a first embodiment, 100, of an underground hangar for storing helicopters includes an underground room, 1, obtained by making an underground structure of reinforced concrete, 2. The underground room 1 is subdivided into two areas, 1a, 1b, connected with each other by means of an access door 3. A first area 1a is provided with a trap door, 4, operated manually to slide on first horizontal guides, 5, which are situated substantially at the ground level and is provided with entrance stairs, 6, and electrical panels, 7. A second area 1b is provided with one or more closing doors 8, which slide along second horizontal guides 9. Each closing door 8 is moved by a gear motor provided at the outlet with a toothed pinion which, makes it slide by engaging with a fixed rack connected to the ground by suitable fixing system, until the second area 1b of the hangar 100 is closed. The second area contains a helicopter carrying platform, 10, and its support columns, 11, which are four in number in this first embodiment.

The platform 10 is provided with four tubular supports, 12, having rectangular shape in the present embodiment, integral with the platform and placed in the regions of the platform four corners and associated to the support columns 11, in such a way as to slide vertically therealong.

The support columns 11 are leaned against the lateral walls of the underground room 1, positioned in the regions of the four vertexes of the second area 1b, and are connected to a floor of the underground room 1 by tie rods, 13, dipped in the reinforced concrete of the floor and provided with self-locking tightening bolts. Advantageously, each column can have an H form and be fixed also, or only, to the wall of reinforced concrete by means of adjusting screws. In this way, the vertical arrangement of the column can be obtained and maintained in a very accurate and simple manner. Each column is provided with a rack, 14, positioned vertically on an inner side of the column 11 and guiding elements, 15, made of material and having a shape suitable to couple with corresponding inner elements of the tubular support 12 to guide the latter to slide vertically along the column 11.

An electro-mechanical driving system for handling the platform 10 includes four gear motors, 16, each of which integral with an inner side of each of the tubular supports 12 and provided at the outlet with a pinion, 18, aimed at engaging with a respective rack 14 of one of the columns 11. The rack 14 and the pinion 18 remain inside the tubular support 12, which has a hole, 19, aimed at allowing the passage of an output shaft, 20, of the gear motor 16, at the end of which the pinion 18 is mounted. The electro-mechanical driving system includes also the presence of an electronic control unit (not shown in FIGS. 1 to 4), powered by current from the mains and provided with an inverter aimed at driving the operation of the gear motors 16. The electronic control unit controls the gear motors in such a way that their operation is always synchronized, and the whole electro-mechanical driving system is powered by the electrical boards 7 present in the first area 1a.

The above described underground hangar 100 forms a storing room, which is extremely reliable and safe, since the underground room 1 is obtained with a structure of reinforced concrete divided into two rooms. This allows the access to the storing room without opening the respective door 8 and keeping the electric control and power boards in a separate room. Furthermore, the helicopter carrying platform is lifted and lowered in an extremely reliable and silent way. This advantage is due to the presence of a plurality of gear motors 16 mounted integral with the platform in correspondence to the support columns 11, and to the tubular supports 12, which protect the coupling between the rack 14 and pinion 18 allowing the sliding along the column 11.

The underground hangar of the invention allows to make use of various advantages with respect to the methods normally used by now for storing helicopters on the ground, generally in suitable sheds or hangars built on the ground. The advantages of the hangar of the invention with respect to the known ones include: the possibility to avoid building of a normal garage, which besides its size and occupied space necessary for its construction, could come up against restrictions imposed by precise regulations on respect for the environment, both municipal and provincial or regional, as well as actually represent an environmental and landscape dimension stretching in the house direct proximity; facilitating of the storing operation of the helicopter which, landing directly on the movable platform, does not need any other transport operation, since the subsequent lowering of the platform and the subsequent closing with the covering plane allow to position it completely inside the structure used as hangar; the automation of the opening and closing operations of the covering plane during arrival and parking step, without manual operations performed by the operator or pilot, who opens the covering plane while the helicopter is approaching during the flight, by means of the impulse of a suitable remote control, and closes it when the vertical downward movement of the platform is completed, which allows in fact to place the helicopter inside the underground structure used as hangar; the automation of opening and closing operations of the covering plane during departure and take-off step, without manual operations performed by the operator, who opens the covering plane while the helicopter is approaching the hangar and closes it when it is raised in flight with the helicopter, by means of the remote control impulse; the landing area coincides with the movable platform for the helicopter positioning inside the underground hangar, which leads to the minimum need for the space necessary to store the helicopter.

These advantages are protected also in other versions of what is described above or other embodiments of an underground hangar for storing helicopters according to the present invention.

Figure 5:
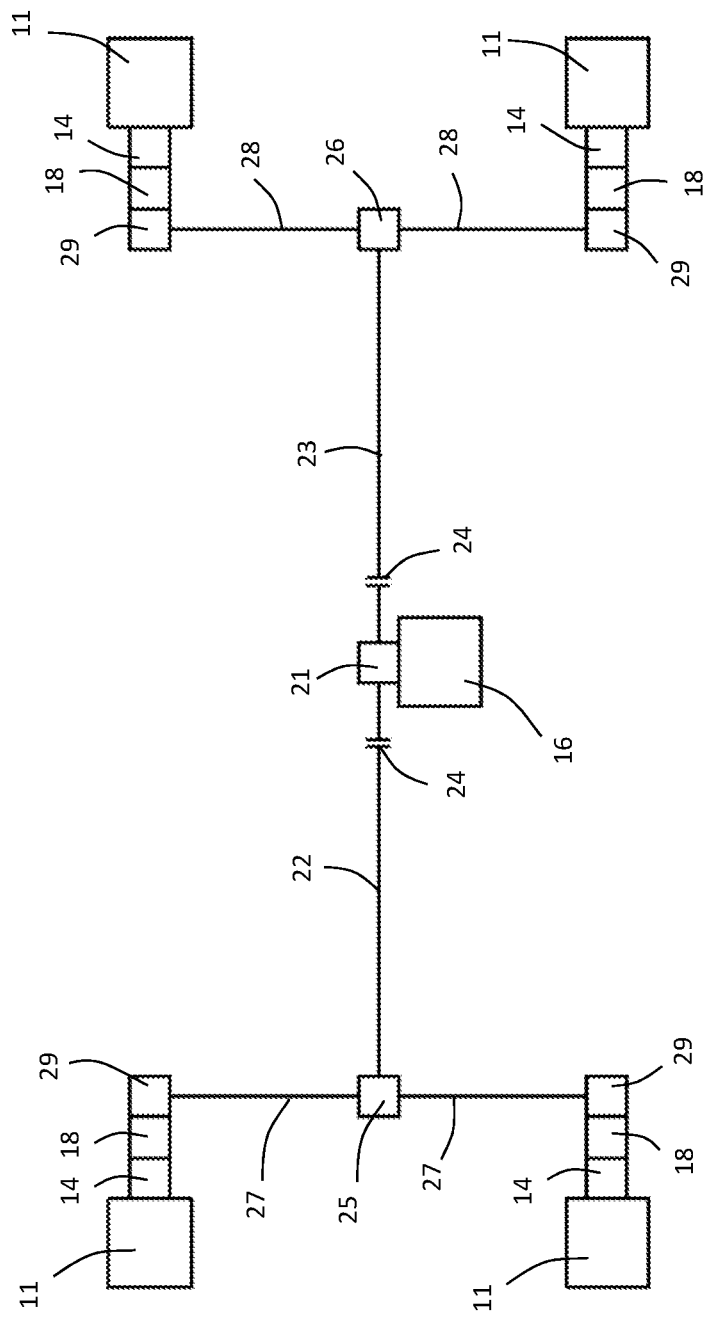
FIG. 5 is a block diagram of an alternative embodiment of an electro-mechanical driving system of the underground hangar according to the present invention.

In a different embodiment, an electro-mechanical driving system for the underground hangar according to the present invention is represented schematically in FIG. 5, and will be described in the following indicating the functionally similar components with the same numeral references used for the embodiment of FIGS. 1 to 4. The driving system of FIG. 5 includes an electronic control unit powered with the mains current and provided with an inverter aimed at operating a single gear motor, 16, arranged in a central position below the platform, which operates a first angular transmission assembly, 21, provided with an inlet and two outlets. Two driving shafts, 22, 23, are mounted at the two outlets of the first angular transmission assembly 21 with the interposition of two joints, 24, such as cardan joints or elastic joints. The driving shafts 22, 23 transmit the motion to a second, 25 and third, 26, angular transmission assemblies mounted centrally in the regions of the longitudinal ends of the platform 10. Other two driving shafts, 27, 28 (or four half-shafts) are mounted in the regions of the two longitudinal ends of the platform 10 orthogonal to the driving shafts 22 and 23, at the outlet of the second and third transmission assembly 25, 26. At the free ends of the shafts 27, 28, which are situated near the columns 11, there are mounted other angular transmission groups, 29, at an inlet and outlet, which are provided, at the outlet, with pinions meshing with racks 14 integral with the columns 11. As it is easy to understand, the above mentioned embodiment allows only one gear motor to be used and ensures mechanically the synchronized lifting and lowering along the four columns 11.

Another embodiment of a driving system of the platform 10 movement includes the presence of a hydraulic equipment, formed by an electric motor group with a hydraulic pump, powered by current from the mains, and a respective control unit for control-distribution, which feeds hydraulic jacks of telescopic type provided with electrovalves for continuous adjustment of the flow rate, mounted to the columns 11, and connected to the platform 10, so as to make it move.

A further embodiment of the driving system includes the presence of an electro-hydraulic mechanical equipment formed by an electric motor group-hydraulic pump, powered by current from the mains, and a respective control unit for control-distribution, which feeds double-acting hydraulic jacks provided with electrovalves for continuous adjustment of the flow rate, which make the platform 10 move by means of a chain connection.

Figure 6:
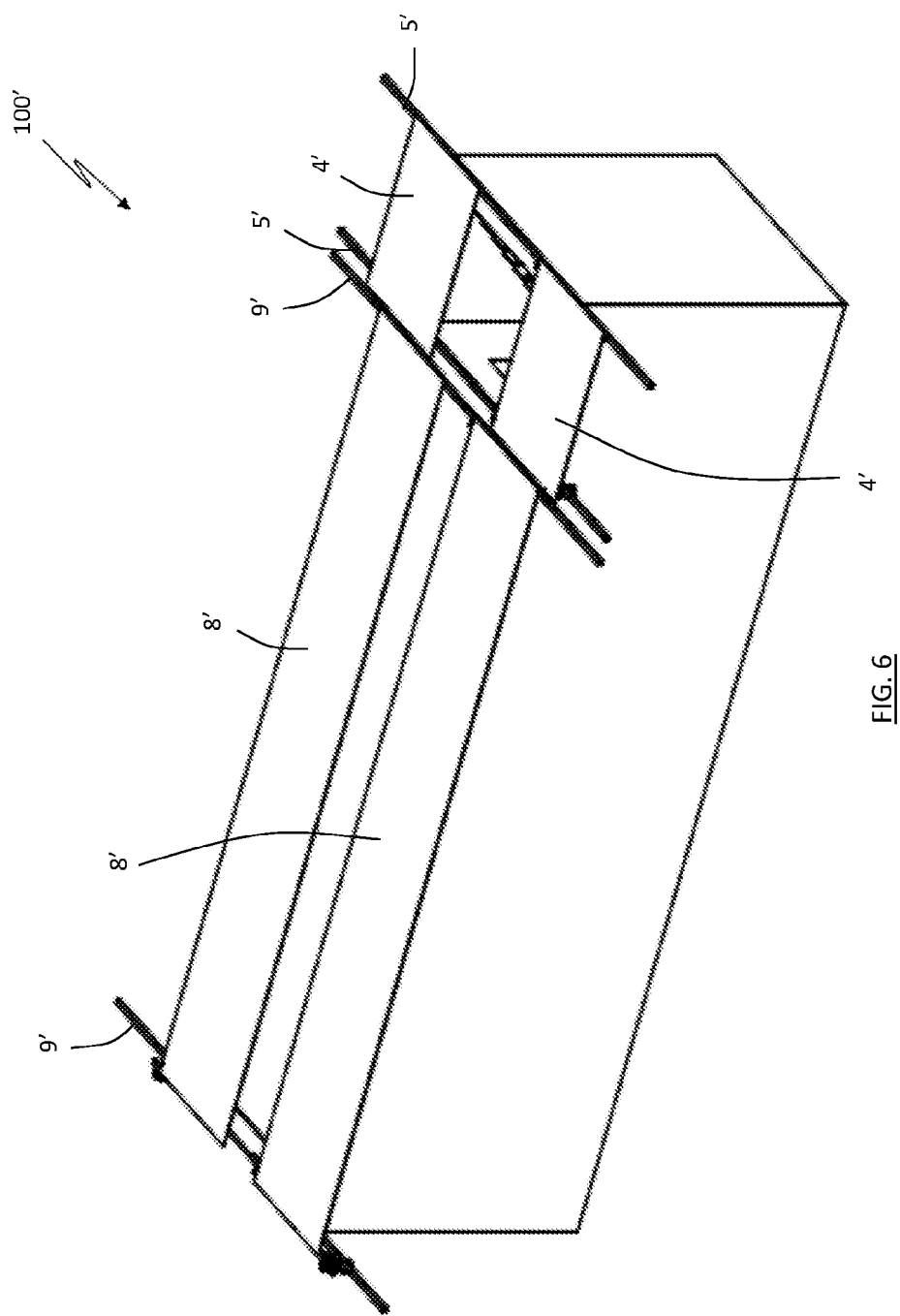
FIG. 6 is a schematic perspective view of a second embodiment of the underground hangar according to the invention.

FIG. 6 shows a second embodiment, 100', of an underground hangar according to the present invention. In this embodiment, a system for covering the underground room 1 is formed by two pairs of opposite sliding trap doors 4', 8'. The sliding trap doors 4' slide on a first pair of guides 5' and are operated manually, with the opposite movement possibly synchronized by the means of motion transmission. The two sliding doors 8' are motorized and slide along second guides. Each door is operated by a gear motor, provided with an outlet toothed pinion, which engages with a fixed rack integral with the ground.

Advantageously, there is an external enclosure, which delimits the area in which the covering panels move, provided with a flashing device, which signals the opening and closing movements of the doors and trap doors.

Figure 7:
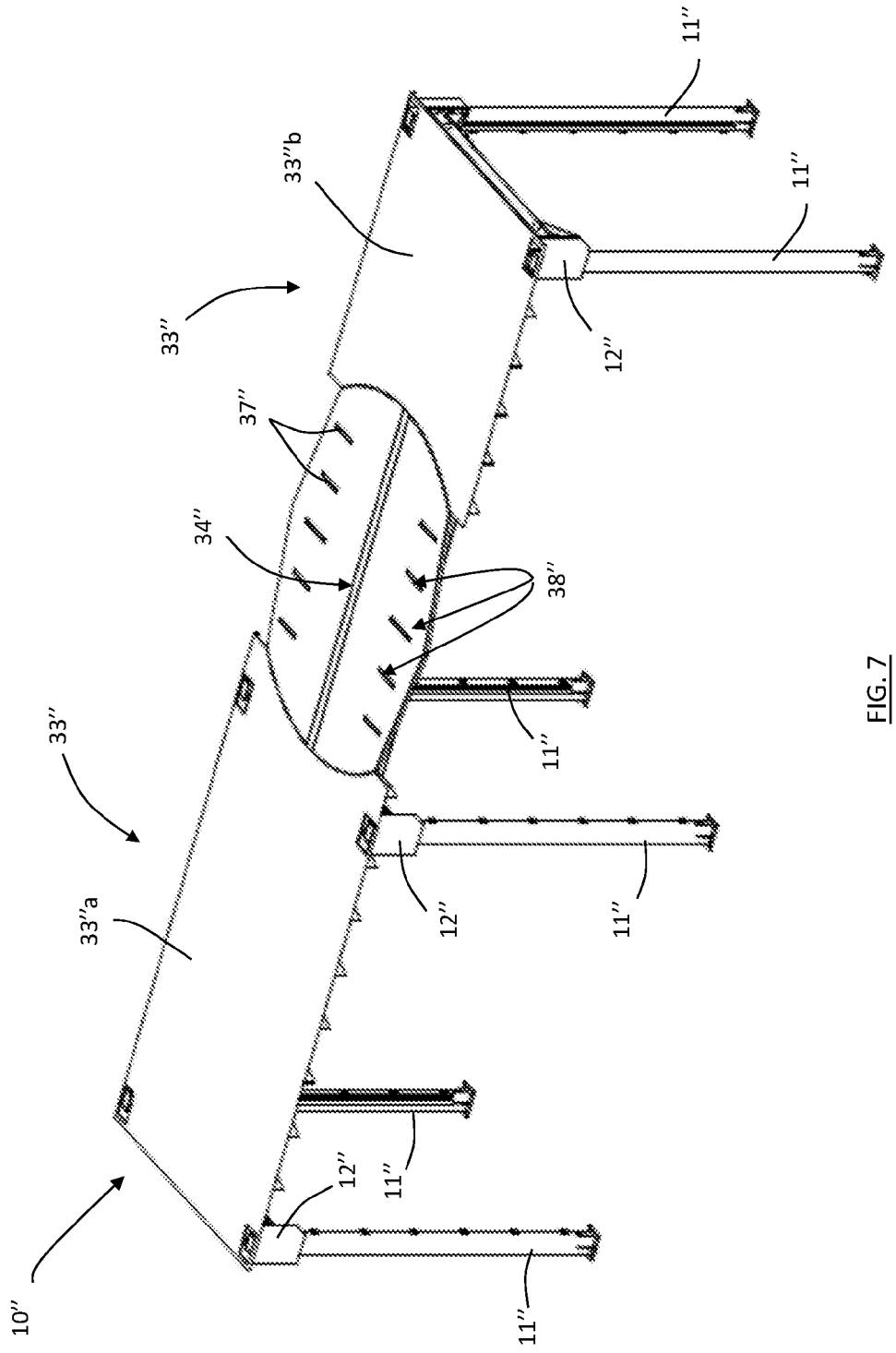
FIG. 7 is a schematic perspective view of a platform and its support columns of a third embodiment of the underground hangar according to the present invention.
Figure 8:
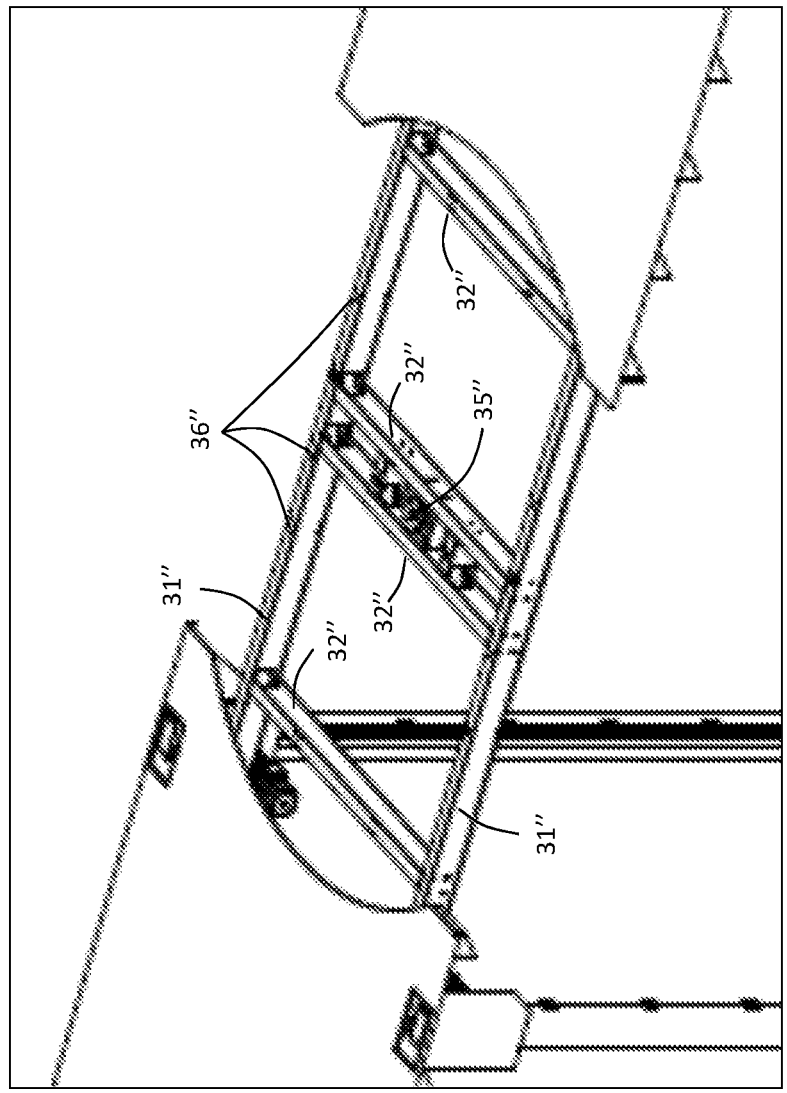
FIG. 8 shows a detail of the platform of FIG. 7, with a rotating portion removed.
Figure 9:
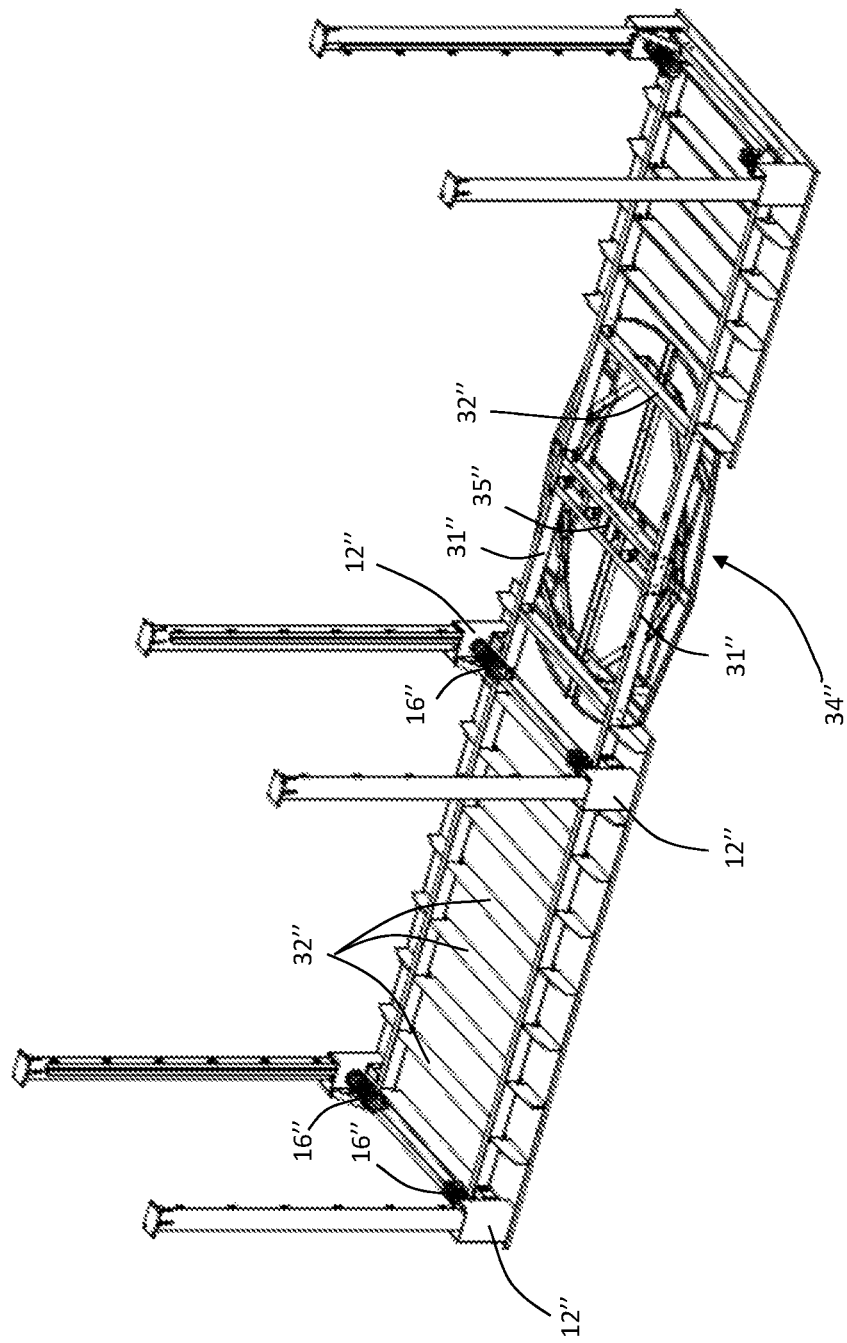
FIG. 9 is a perspective bottom view of the platform and its support columns of FIG. 7.

Now, with reference to FIGS. 7 to 9, we will describe a third embodiment of an underground hangar for storing helicopters according to the present invention, concerning in particular the group formed by the platform, support columns and driving system.

The underground hangar of the present embodiment comprises a platform, 10", formed by a beam bearing structure consisting of at least two longitudinal beams, 31", connected by a plurality of transverse beams, 32", and a walking surface supported by the beam bearing structure. The walking surface consists of a fixed walking surface, 33" and a rotating walking surface, 34", which are resting on the beam bearing structure and which altogether form a single upper face for supporting the helicopter. The fixed walking surface 33" is divided into a right portion of the walking surface, 33"$a$ and e left portion of the walking surface, 33"$b$, with rotating walking surface 34" interposed therebetween. The rotating walking surface 34" is resting on the beam bearing structure and rotates with respect to a substantially barycentric vertical axis, on which the walking surface is driven into rotation by means of a gear motor, 35" integral with the beam bearing structure. Otherwise, the rotating walking surface can be supported by a thrust bearing, fifth wheel or another element to be driven to rotate manually. A plurality of rolling elements, 36", interposed between the upper face of the beam bearing structure and the lower face of the rotating walking surface 34", allow to considerably reduce friction. The longitudinal extension of the rotating walking surface is such as to be able to contain completely the skids of a helicopter to be parked, while the longitudinal length of the right portion 33"$a$ is different from the longitudinal length of the left portion 33"$b$ and allows for the different entity from which protrude the front part and rear part of the helicopter with respect to its skids. Thanks to the presence of the rotating walking surface 34", the plan dimensions of the platform 10" it is can be reduced to a minimum, maintaining both the width and length little greater than the respective overall width and length of the helicopter to be parked. In fact, on the one hand, the rotating platform is a reference for the correct positioning of the helicopter skids on the walking surface during the landing step, and on the other hand, it allows to correct misalignments of the helicopter with respect to the platform which occur during the landing step, by rotating suitably the rotating walking, surface 34" after the landing so as to restore the alignment. Advantageously, the angular position of the rotating walking surface can be adjusted in prefixed positions due to the presence of suitable adjusting means, constituted, for example, by a pin, integral with the rotating walking surface, moving elastically in vertical direction, aimed at engaging with a plurality of housing seats integral with the bearing structure.

Moreover, two sets of rolls, 37", 38" are mounted rotatably in the rotating walking surface 34", so as to allow a longitudinal adjustment of the position of the helicopter on the platform 10". The two sets of rolls 37", 38" are arranged each in correspondence to the placing area of one of the helicopter skids and each set has a plurality of rolls (at least two) arranged aligned with each other with respect to the direction transversal to the platform 10" and offset with respect to the longitudinal direction, with the respective rotation axis being horizontal and oriented in the transversal direction. The rolls slightly protrude with respect to the upper face of the walking surface 34", in such a way that the helicopter skids remain supported by the rotating rolls and the helicopter can be easily pushed forward or backward on the platform 10", also manually.

Furthermore, the third embodiment includes six support columns 11", three for each of the long sides of the second area of the underground room. This measure allows to reduce the dimensioning of the beam bearing structure and to considerably contain the inflection of the platform caused by the helicopter weight. Obviously, there will be also six tubular supports integral with the platform, each one associated with one column 11' and having associated thereto a gear motor 16".

Obviously, the above described advantages of the underground hangar for storing helicopters according to the invention remain unchanged, even in presence of other variants in addition to those already pointed out, for example, concerning the number of support columns, the platform 10 conformation and structure, the driving system, the covering system, images that are part of the images acquired by a single surface S of the material M to be examined, resolution of the images, angle of incidence of the light beam on the surface S and, in general, modes of processing the acquired images.

These and other versions and changes of practical-application nature can be applied to the apparatus of the present invention, yet always protecting the above outlined advantages deriving therefrom, and always remaining within the protection scope provided by the following claims.

The invention claimed is:

1. An underground hangar for storing helicopters, comprising:
an underground room including at least four columns, wherein each column is provided with a rack;
a lifting platform carrying helicopters;

an electromechanical driving system including at least one gear motor provided at an outlet with at least one toothed pinion mounted to mesh with the rack;

wherein the underground room is formed by an underground structure of reinforced concrete, wherein the platform is provided with at least four guiding tubular supports, each of which is operable to interface with one of the columns to be guided, by means of respective guiding elements, to slide vertically there along, wherein the driving system includes an electronic control unit operable to control the gear motor; and one or more closing doors of the underground room, which slide along horizontal guides and each of which is moved by the gear motor provided at the outlet with a toothed pinion which, meshing with a fixed rack connected to the ground by a fixing system, makes it slide until a portion of the hangar is closed.

2. The underground hangar according to claim 1, wherein the columns are connected to a floor of the underground room by means of tie rods dipped in the reinforced concrete.

3. The underground hangar according to claim 1, wherein the driving system includes a plurality of gear motors, with each gear motor being internally integral with one of the tubular supports and provided at the outlet with a toothed pinion for meshing with the rack integral with an inner side of a respective support column, so as to control vertical sliding of the platform with respect to the columns.

4. The underground hangar according to claim 1, wherein the electronic control unit is powered by current from a main generator and the driving system includes an inverter.

5. The underground hangar according to claim 1, wherein the rack of the column, to which the tubular support is associated together with the pinion engaged therewith, is driven into rotation by the gear motor integral with the tubular support and remains inside the tubular support, which has a hole operable to allow passage of an output shaft of the gear motor at an end of which is mounted the pinion.

6. The underground hangar according to claim 1, wherein the driving system includes an electronic control unit powered by current from a main generator and is provided with an inverter, the gear motor situated in a central position below the platform with the gear motor guiding a first angular transmission assembly provided with an inlet and two outlets, two driving shafts mounted at the two outlets of the first angular transmission assembly with an interposition of two joints, with the two driving shafts transmitting the motion to second and third angular transmission assemblies mounted centrally in correspondence to longitudinal ends of the platform, with two other driving shafts mounted in a region of two longitudinal ends of the platform orthogonal to the two driving shafts, at the outlet of the second and third transmission assemblies, at free ends of the two other driving shafts, there being mounted an angular transmission group at an inlet and outlet, which is provided, at the outlet, with pinions meshing with racks integral with the columns.

7. The underground hangar according to claim 1, wherein the driving system includes a hydraulic equipment formed by an electric motor group with a hydraulic pump, powered by current from a main generator, and a control unit for control-distribution, which feeds telescopic hydraulic jacks provided with electrovalves for continuous adjustment of a flow rate, mounted to the columns, which hydraulic jacks are connected to the platform to make it move.

8. The underground hangar according to claim 1, wherein the driving system includes an electro-hydraulic mechanical equipment formed by an electric motor group-hydraulic pump, powered by current from a main generator, and a control unit for control-distribution, which feeds double-acting hydraulic jacks provided with electrovalves for continuous adjustment of a flow rate, which make the platform move by means of a chain connection.

9. The underground hangar according to claim 1, wherein the underground room is subdivided into two areas connected with each other by means of an access door, a first area being provided with at least one trap door, operated manually to slide along horizontal guides situated substantially at ground level and is provided with entrance stairs and electrical panels, and a second area including the support columns and the platform.

10. The underground hangar according to claim 9, further comprising two opposite sliding doors or two opposite sliding trap doors.

11. The underground hangar according to claim 10, further comprising an external enclosure, which delimits an area in which the doors and covering trap doors moves, provided with a flashing device for signalling opening and closing movements of the doors and trap doors.

12. The underground hangar according to claim 1, wherein six support columns are provided, three for each of a long side of the underground room.

13. The underground hangar according to claim 1, wherein the platform includes a beam bearing structure formed by at least two longitudinal beams connected by a plurality of transverse beams, and a walking surface resting on the beam bearing structure.

14. The underground hangar according to claim 13, wherein the walking surface of the platform includes a fixed walking surface and a rotating walking surface which altogether form a single upper face for supporting the helicopter, wherein the fixed walking surface is divided into a right portion of the walking surface and a left portion of the walking surface, with the rotating walking surface interposed therebetween.

15. The underground hangar according to claim 14, wherein the rotating walking surface rests on the bearing structure of the platform and rotates with respect to a substantially barycentric vertical axis, on which it is driven into rotation, with a plurality of rolling elements being interposed between the upper face of the bearing structure and a lower face of the rotating walking surface so as to reduce friction during the rotation of the rotating walking surface.

16. The underground hangar according to claim 14, wherein two series of rolls are rotatably mounted in the rotating walking surface, so as to support skids of the helicopter and allow longitudinal adjustment of a position of the helicopter on the platform.

17. The underground hangar according to claim 14, wherein an angular position of the rotating walking surface is adjustable in prefixed positions due to the presence of adjusting means formed by at least one pin integral with the rotating walking surface, which moves elastically in a vertical direction, operable to engage with a plurality of housing seats integral with the bearing structure.

* * * * *